United States Patent [19]
Jones

[11] Patent Number: 5,759,074
[45] Date of Patent: Jun. 2, 1998

[54] IMPELLER MOUNTING SYSTEM FOR A PERSONAL WATERCRAFT

[75] Inventor: James R. Jones, Neosho, Wis.

[73] Assignee: Brunswick Corporation, Lake Forest, Ill.

[21] Appl. No.: 719,621

[22] Filed: Sep. 25, 1996

[51] Int. Cl.$^6$ ............................................. B63H 11/08
[52] U.S. Cl. ..................... 440/38; 416/244 B; 440/83
[58] Field of Search ......................... 440/83, 38, 40–43; 60/221; 416/244 R, 244 B

[56] References Cited

U.S. PATENT DOCUMENTS

| | | | |
|---|---|---|---|
| 3,422,788 | 1/1969 | Horan, Jr. | 440/41 |
| 3,756,741 | 9/1973 | Woell, Jr. | 60/221 |
| 3,943,876 | 3/1976 | Kiekhaefer | 440/43 |
| 4,026,235 | 5/1977 | Woodfill | 440/41 |
| 4,231,315 | 11/1980 | Tachibana et al. | 440/43 |
| 4,252,075 | 2/1981 | Kobayashi | 440/42 |
| 4,315,749 | 2/1982 | Baker et al. | 440/42 |
| 4,538,997 | 9/1985 | Haglund | 440/41 |
| 4,541,808 | 9/1985 | Ono et al. | 440/38 |
| 4,643,685 | 2/1987 | Nishida | 440/42 |
| 4,713,027 | 12/1987 | Fowler | 440/38 |
| 4,722,707 | 2/1988 | Murase | 440/38 |
| 4,765,075 | 8/1988 | Nakase et al. | 440/38 |
| 4,813,898 | 3/1989 | Nakase et al. | 440/111 |
| 4,925,408 | 5/1990 | Webb et al. | 440/38 |
| 4,971,584 | 11/1990 | Inoue et al. | 440/42 |
| 5,114,368 | 5/1992 | Moyle et al. | 440/47 |
| 5,123,867 | 6/1992 | Broinowski | 440/42 |
| 5,151,057 | 9/1992 | Kobayashi et al. | 440/38 |
| 5,152,704 | 10/1992 | Carlson | 440/38 |
| 5,167,547 | 12/1992 | Kobayashi et al. | 440/42 |
| 5,176,547 | 1/1993 | Kobayashi et al. | 440/38 |
| 5,184,966 | 2/1993 | Kobayashi et al. | 440/38 |
| 5,224,887 | 7/1993 | Futaki | 440/46 |
| 5,234,361 | 8/1993 | Dickinson et al. | 440/47 |
| 5,244,425 | 9/1993 | Tasaki et al. | 440/47 |
| 5,277,631 | 1/1994 | Henmi | 440/47 |
| 5,282,444 | 2/1994 | Ito et al. | 123/192.2 |
| 5,310,368 | 5/1994 | Kamitake | 440/38 |
| 5,330,374 | 7/1994 | Ishino et al. | 440/42 |
| 5,342,227 | 8/1994 | Suganuma | 440/38 |
| 5,366,397 | 11/1994 | Suganuma et al. | 440/39 |
| 5,401,198 | 3/1995 | Toyohara et al. | 440/47 |
| 5,522,742 | 6/1996 | Futaki et al. | 440/46 |

FOREIGN PATENT DOCUMENTS

| | | | |
|---|---|---|---|
| 1144938 | 3/1985 | U.S.S.R. | 440/38 |

*Primary Examiner*—Sherman Basinger
*Attorney, Agent, or Firm*—Andrus, Sceales, Starke & Sawall

[57] ABSTRACT

An impeller mounting system for a jet propelled watercraft uses an impeller shaft having a tapered portion and an impeller hub having a coaxial opening with a corresponding tapered seat. The impeller hub is tightened onto the impeller shaft so that the tapered portion of the impeller shaft presses against the tapered seat of the coaxial opening in the impeller hub with sufficient force to prevent the impeller hub from slipping with respect to the impeller shaft when the impeller shaft rotates to drive the impeller hub. Static frictional forces between the tapered surfaces bear the entire rotational load for the jet drive, therefore reducing chatter noise and wear which can be caused by load bearing splines or the like. The tapered seat configuration virtually assures proper concentric alignment of the impeller within the wear ring. The impeller shaft also preferably includes a bearing support portion extending rearward from the coaxial opening in the hub. The bearing support portion of the impeller shaft is preferably supported rigidly in a bearing support sleeve located in the hub of a stator mounted rearward of the impeller. This impeller mounting system facilitates easy assembly and disassembly when it is desirable to replace the impeller or otherwise provide maintenance to the jet drive.

12 Claims, 4 Drawing Sheets

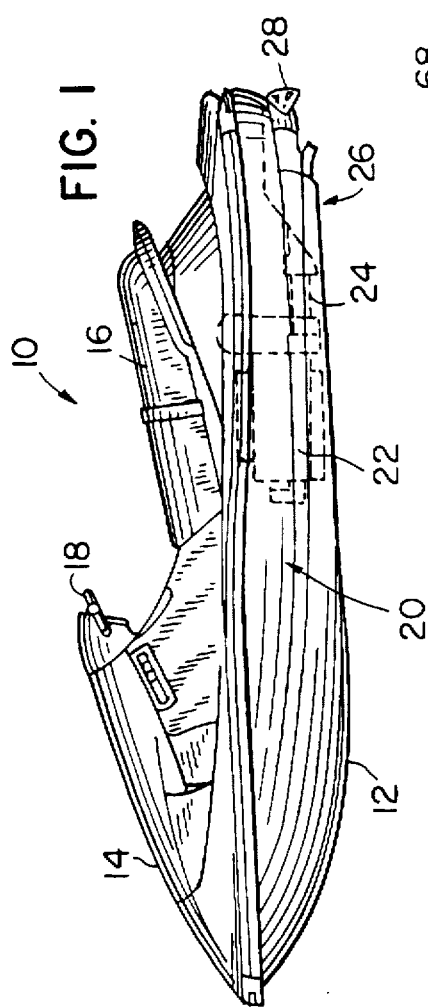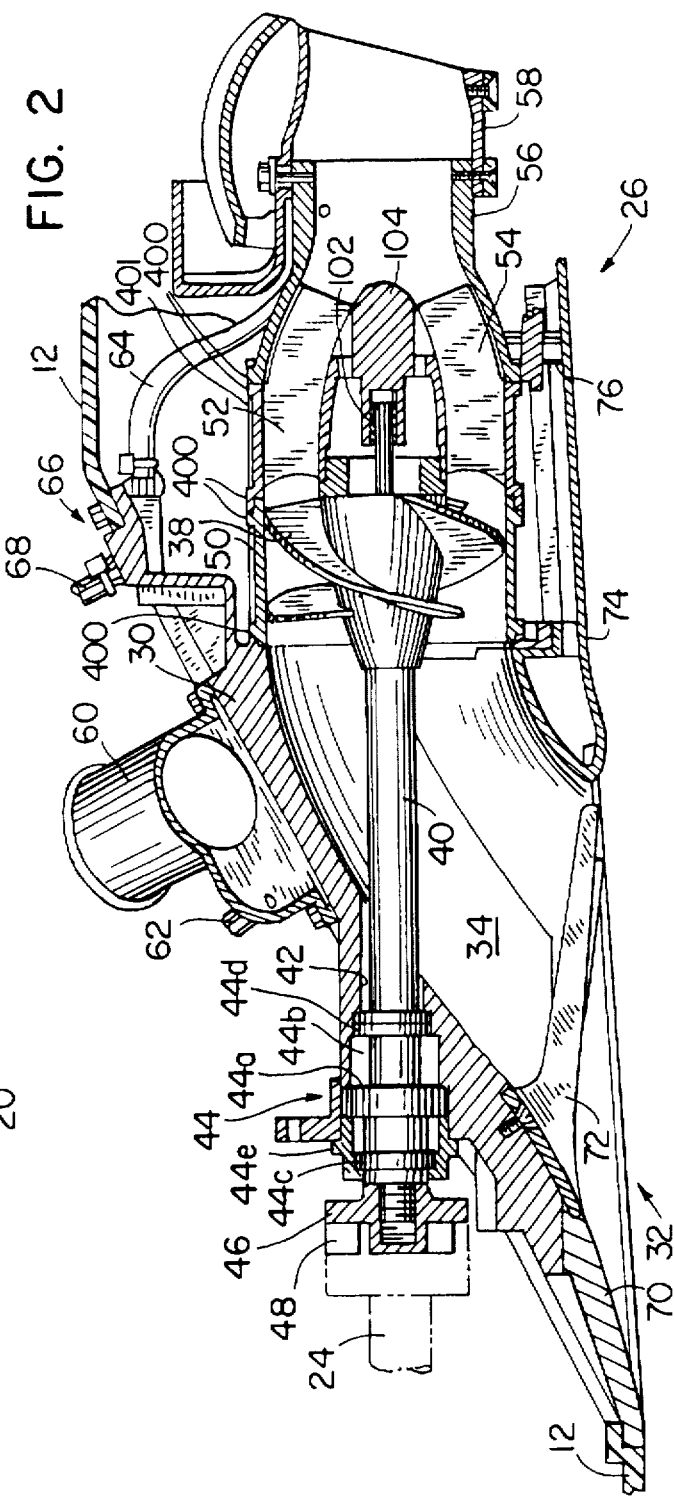

5,759,074

IMPELLER MOUNTING SYSTEM FOR A PERSONAL WATERCRAFT

FIELD OF THE INVENTION

The invention relates to jet propulsion systems for a personal watercraft. In particular, the invention relates to an impeller mounting system that reduces pump noise, helps to properly align the impeller, and also facilitates quick assembly and disassembly of the pump.

BACKGROUND OF THE INVENTION

Jet drives for personal watercraft typically have an engine driven jet pump which exits a jet of water rearward of the watercraft to propel the watercraft. An inlet opening is positioned through the underside of the watercraft and allows sea water to flow to the pump. The jet pump generally consists of an impeller and a stator located within a duct followed by a nozzle. The pump impeller provides energy to the flow of sea water through the pump. The impeller normally has an impeller hub and one or more blades extending radially from the hub. The impeller hub is typically mounted to an impeller shaft, and rotates within a wear ring. The impeller shaft is driven by the engine to provide power to the pump.

The impeller shaft is usually coupled to the engine output shaft to provide a unidirectional drive. In watercraft jet drives, reverse is normally provided by a reverse gate that can be dropped rearward of the watercraft to deflect the jet exiting the pump and redirect pump thrust. Pump performance requires that the impeller be properly aligned. It is important that the impeller mounting system be designed to provide for proper impeller alignment, even after heavy or extreme pump usage. Typical impeller mounting systems use splining or other mechanical interference devices to bear the rotational load of the impeller.

In jet propelled watercraft, the pump can be a considerable source of irritating noise. One of the objects of the invention is to provide an impeller mounting system that reduces the amount of chatter noise propagating from the mounting interface between the impeller drive shaft and the impeller.

The performance of the watercraft depends in large part on the design and condition of the impeller. Therefore, it is often desirable while servicing a jet propelled watercraft to remove and/or replace the impeller. Another object of the invention is to provide an impeller mounting system that is convenient and quick to assemble and disassemble.

SUMMARY OF THE INVENTION

The invention involves the use of an impeller drive shaft having a tapered mounting portion in which the diameter of the impeller shaft lessens as the impeller shaft extends rearward. The tapered mounting portion is adapted to mount within a coaxial opening in the impeller hub which has a tapered seat corresponding to the tapered portion on the impeller shaft. A jam nut is used to tighten the impeller hub on the impeller shaft so that the tapered portion of the impeller shaft presses against the tapered seat of the coaxial opening in the impeller hub with sufficient force to prevent the impeller hub from slipping with respect to the impeller shaft when the impeller shaft rotates to drive the impeller hub. Static frictional forces between the surfaces of the tapered portion of the impeller shaft and the tapered seat of the coaxial opening in the impeller hub bear the entire rotational load of the jet pump without creating any chatter noise, or wearing the splined joint. In addition, the tapered seat mounting configuration helps to properly align the impeller concentrically within the pump wear ring.

The impeller shaft preferably has a bearing support portion rearward of the threaded portion. The bearing support portion is supported rearward of the coaxial opening in the impeller hub in a stationary bearing support. The stationary bearing support is preferably located coaxially within the hub of a stator mounted rearward of the wear ring in which the impeller rotates. The preferred diameter of the bearing support portion of the impeller shaft is less than the diameter of the threaded portion of the impeller shaft. The diameter of the threaded portion of the impeller shaft is preferably less than the smallest diameter of the tapered portion of the impeller shaft. Because of this geometry, the impeller shaft can be conveniently positioned through the coaxial opening in the impeller hub, through the tightening nut and into the bearing support and the stator hub. The stator housing can be securely mounted together with the wear ring to an intake housing for the jet pump to provide stable support for the aft end of the impeller shaft. This preferred impeller mounting system is quite accessible for assembly and disassembly in case impeller removal is desirable, or other maintenance on the pump is desirable.

It is also preferred that the impeller shaft include a splined portion between the tapered portion and the threaded portion. Likewise, the coaxial opening in the hub preferably includes a splined section corresponding to the splined portion on the impeller shaft. The splines on the impeller shaft and in the coaxial opening in the impeller hub should not bear rotational load under normal operating conditions, but should prevent excessive slipping in case the hub becomes loose against the impeller shaft for any number of reasons. It is therefore preferred that the splines loosely engage one another to facilitate assembly and disassembly. Since static frictional forces between the tapered portion of the impeller shaft and the tapered section in the coaxial opening on the impeller hub bear the entire rotational load under normal operation conditions, the presence of the splines does not create additional chatter noise under normal operating conditions.

The impeller hub also preferably includes internally extending flanges to facilitate removal of the impeller from the impeller shaft when it is desirable to disassemble the pump.

Other features and objects of the invention should be apparent to those skilled in the art upon reviewing the following drawings and description thereof.

BRIEF DESCRIPTION OF THE DRAWINGS

FIG. 1 is a schematic drawing illustrating a personal watercraft.

FIG. 2 is a side view of a jet pump assembly for propelling the watercraft in FIG. 1.

DETAILED DESCRIPTION OF THE DRAWINGS

Figure 3:
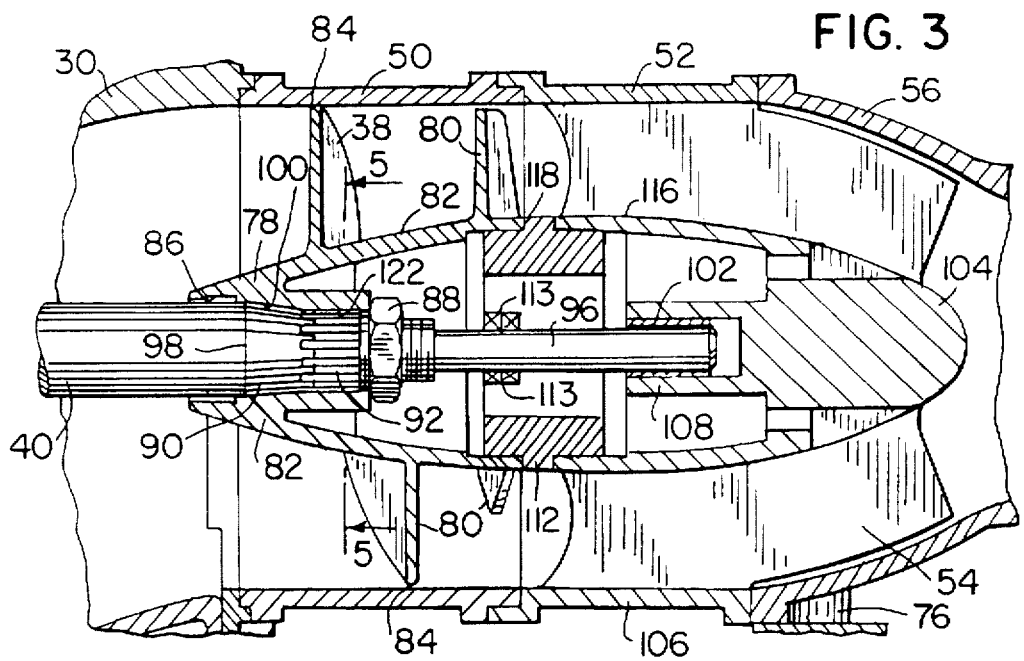
FIG. 3 is a longitudinal sectional view of an impeller mounting system for the pump shown in FIG. 2.

FIG. 1 shows a personal watercraft 10. The personal watercraft 10 has a hull 12 and a deck 14, both preferably made of fiber reinforced plastic. A driver and/or passenger riding on the watercraft 10 straddles the seat 16. The driver steers the watercraft 10 using a steering assembly 18 located forward of the seat 16.

An engine compartment 20 is located between the hull 12 and the deck 14. A gasoline fueled internal combustion engine 22 is located within the engine compartment 20. The engine has an output shaft that is coupled via coupler 24 to a jet pump located rearward of the engine 22 generally in the vicinity shown by arrow 26. The engine 22 and the jet pump 26 provide a unidirectional drive. A reverse gate 28 can be dropped rearward of the pump 26 to provide reverse propulsion for the watercraft 10. When reverse gate 28 is located in an up position, the pump 26 provides forward thrust for the watercraft 10. Neutral thrust can be achieved by positioning the reverse gate 28 between the forward and the reverse positions.

FIG. 2 shows the jet pump 26 using an impeller mounting system in accordance with the invention. The pump 26 includes an intake housing 30 that is attached to the hull 12. The intake housing 30 has an inlet opening 32 that provides a path for sea water to flow into an intake duct 34 located within intake housing 30. Sea water flows upward and rearward through the intake duct 34 to an impeller 38. The impeller 38 is rotatably driven by an impeller drive shaft 40. The impeller drive shaft 40 passes through an impeller drive shaft opening 42 in the intake housing 30, and is coupled to the engine output shaft via coupler 24. As the impeller shaft 40 passes through the intake housing 30, the impeller shaft 40 is supported by a sealed bearing assembly 44. The sealed bearing assembly 44 includes a ball bearing 44a mounted in a lubrication chamber 44b. The lubrication chamber 44b is filled with a lubricant, such as grease. Seals 44c and 44d are located around the impeller shaft 40 to seal the lubrication chamber 44b. A sleeve 44e forms the outer portion of the lubrication chamber 44b, and secures the ball bearing 44a in position. The preferred intake housing 30 as well as the preferred sealed bearing assembly 44 is described in detail in copending patent application Ser. No. 08/710,868, entitled "Intake Housing For Personal Watercraft", by James R. Jones, and assigned to the assignee of the present application, which is also herein incorporated by reference.

External to the intake housing 30, a coupling head 46 is threaded onto the impeller drive shaft 40. The impeller coupling head 46 is preferably driven by the coupler 24 through an elastomeric member 48, although other coupling techniques can be used in accordance with the invention. The preferred coupler 24, elastomeric member 48, and impeller coupling head 46, are disclosed in detail in copending patent application Ser. No. 08/803,988, entitled "Exhaust System For Personal Watercraft", by Jerry Hale, and assigned to assignee of the present application which is herein incorporated by reference.

The impeller 38 rotates within a wear ring 50 to accelerate sea water flowing through the intake duct 34. A stator 52 is located rearward of the impeller 38 and the wear ring 50. The stator 52 has several stationary vanes 54, preferably seven (7) vanes, to remove swirl from the accelerated sea water. When the sea water exits the stator 52, it flows through a nozzle 56. The preferred construction for the stator 52 and the nozzle 56 is described in detail in copending U.S. patent application Ser.No. 08/710,869, entitled "Stator And Nozzle Assembly For A Jet Propelled Personal Watercraft", by James R. Jones, and assigned to the assignee of the present application, which is herein incorporated by reference.

Sea water exiting the nozzle 56 is directed by rotating rudder 58 about a vertical axis to steer the personal watercraft 10. The reverse gate 28 is preferably mounted to the nozzle 56 along a horizontal axis. The preferred reverse gate mechanism is describe in detail in copending patent application Ser. No. 08/783,440, entitled "Reverse Gate For Personal Watercraft", by James R. Jones, Peter Grinwald and Richard Christians and assigned to the assignee of the present application, which is herein incorporated by reference.

An exhaust adapter 60 is mounted to the top surface of the inlet housing 30. The exhaust adapter 60 receives engine exhaust from the engine 22 and guides the exhaust into the intake housing 30 around the intake duct 34. Cooling water is fed to the engine 22 from the stator 52 through a nipple (not shown) and returns from the engine 22 to the exhaust adapter 60 through nipple 62. A siphoning tube 64 attached through the nozzle 56 provides a venturi effect to siphon water within the bilge of the watercraft 10. Siphoning tube 64 is connected through the top of intake housing 30 using a fitting 66. A bailing tube 68 attached to fitting 66 is connected to a bilge member having a screened opening located in the bilge of the watercraft 10. A siphon break is preferably provided in the bailing tube 68 to prevent the watercraft 10 from inadvertently flooding when the watercraft is at rest.

An inlet adapter plate 70 is connected to the intake housing 30 upstream of the intake duct 34 to adapt the intake housing 30 to the hull 12 on the underside of the watercraft 10. A tine assembly 72 has a plurality of tines that extend rearward from the inlet adapter 70 to cover the inlet opening 32. A ride plate 74 is mounted to the inlet adapter 70 rearward of the inlet opening 32. The ride plate 74 covers the area rearward of the inlet opening 32 to the transom of the watercraft 10 so that the pump components are not exposed below the watercraft 10. The ride plate 74 is supported in part by a depending boss 76 on the nozzle 56. The preferred inlet adapter system, including the inlet adapter plate 70, the tine assembly 72, and the ride plate 74, are disclosed in detail in copending patent application Ser. No. 08/717,915, entitled "Inlet Adapter For A Personal Watercraft", by James R. Jones, and assigned to the assignee of the present application, which is herein incorporated by reference.

Figure 6:
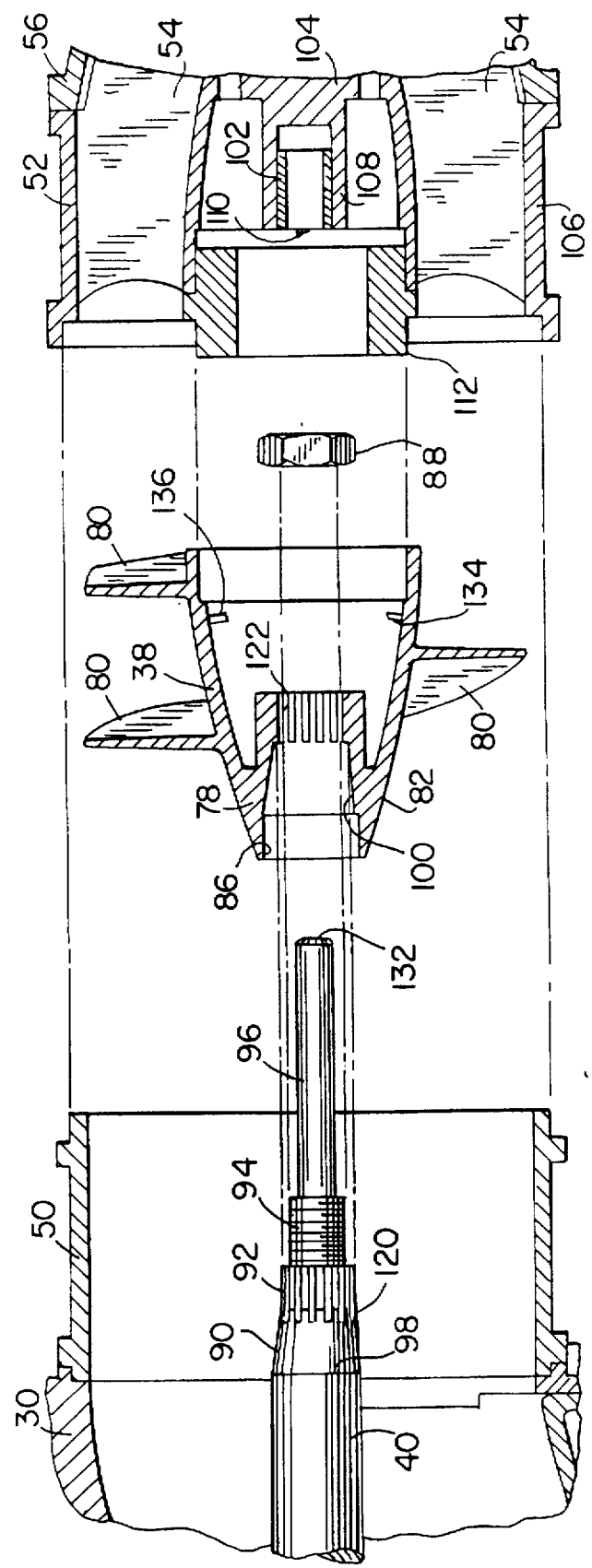
FIG. 6 is an assembly view of an impeller mounting system in accordance with the invention.

Referring now to FIGS. 3 and 6, the impeller 38 has a hub 78, and blades 80 which extend outward from the impeller hub 78. Preferably, the impeller has three or four blades 80. The impeller blades 80 should be equally spaced and the impeller 38 should be balanced. The impeller hub 78 has an outer surface 82 that diverges as the surface 82 extends rearward. The impeller blades 80 angle rearward as the blades 80 extend partially around the hub 38. Each blade 80 typically extends more than ¼ around the hub 38. An outer edge 84 of each impeller blade 80 is in close proximity to the inner surface of the wear ring 50. The impeller 38 is preferably made of stainless steel. The wear ring 50 is preferably made of stainless steel.

The impeller hub 38 has a coaxial opening 86. The hub 38 is secured to the impeller shaft 40 by positioning the impeller shaft 40 through the coaxial opening 86 in the hub 38 and tightening jam nut 88 on the impeller shaft 40.

The impeller shaft 40 is preferably made of stainless steel. The impeller shaft 40 should resist corrosion and should be stiff enough to resist flexing and twisting under load.

The aft end of the impeller shaft 40 includes a tapered mounting portion 90 rearward of the main portion 40, a splined portion 92 rearward of the tapered portion 90, a threaded portion 94 rearward of the splined portion 92, and a non-threaded bearing support portion 96 located rearward of the threaded portion 94. The diameter of the main portion 40 of the impeller shaft is preferably constant and is preferably larger than the diameter of the portions (90, 92, 94 and 96) rearward of the main portion 40 of the impeller shaft. A forwardmost edge 98 of the tapered portion 90 is adjacent the main portion 40 of the impeller shaft. Along the forwardmost edge 98, the diameter of the tapered portion 90 is the same as the aft portion of the main portion 40 of the impeller shaft. The preferred diameter at the forwardmost edge 98 of the tapered portion is preferably about 1.2 inches. As the tapered portion 90 of the impeller shaft 40 extends rearward, the diameter of the shaft becomes smaller. It is preferred that the diameter across the tapered portion 90 lessen linearly so that the tapered portion 90 of the shaft is generally frustoconical in shape. The length of the tapered portion 90 is preferably 0.875 inches. Thus, the cone angle for the preferred frustoconical tapered portion 90° is about 10° included, and should be less than 30°. The slope and length of the tapered portion 90 should be selected so that the surface of the tapered portion 90 can provide sufficient static friction forces to prevent the impeller hub 38 from slipping with respect to the surface of the tapered portion 90 when the impeller shaft 40 rotates to drive the impeller hub 38.

The coaxial opening 86 in the impeller hub 38 includes a tapered seat 100 corresponding generally to the tapered portion 90 on the impeller shaft 40, however, the tapered seat 100 of the coaxial opening 86 on the hub 38 is preferably slightly longer than the tapered portion 90 on the impeller shaft 40. When the impeller 38 is positioned so that the impeller shaft 40 extends through the coaxial opening 86 in the impeller hub 78, the threaded portion 94 of the impeller shaft is exposed rearward of the coaxial opening 86 through the impeller hub 78. Jam nut 88 engages the threaded portion 94 of the impeller shaft to tighten the impeller shaft 40 within the coaxial opening 86 through the impeller hub 78, so that the tapered portion 90 of the impeller shaft presses against the tapered seat 100 of the coaxial opening 86 in the impeller hub 78 with sufficient force to prevent the impeller hub 78 from slipping with respect to the impeller shaft 40 when the impeller shaft 40 rotates to drive the impeller 38. In the preferred construction, the jam nut 88 should be tightened to at least 125 foot-pounds of torque. Proper concentric alignment of the impeller 38 within the wear ring 50 is facilitated because of forcing the tapered portion 90 of the impeller shaft against the tapered seat 100 of the coaxial opening 86 in the impeller hub 78.

The non-threaded bearing support portion 96 extends rearward from the threaded portion 94. The non-threaded bearing support portion 96 is rotatably supported by a bearing support sleeve 102 that is located rearward of the coaxial opening 86 through the impeller hub 38. The bearing support sleeve 102 is preferably mounted within the stator hub 104. The stator hub 104 is located coaxially within the stator housing 106 by stator vanes 54 which attach the stator hub 104 to the stator housing 106. The stator housing 106 and the wear ring 50, as well as the nozzle 56, are rigidly mounted to the intake housing 30 as described in detail in copending patent application Ser. No. 08/710,868, entitled "Intake Housing For Personal Watercraft", by James R. Jones, and assigned to the assignee of the present application, which is herein incorporated by reference. In particular, as shown in FIG. 2, wear ring 50, stator 52, and nozzle 56 each have flanges 400 having holes for receiving mounting studs 401. The mounting studs 401 extend through the outer flanges 400 in the wear ring 50, the stator 52, and the nozzle 56, and thread into openings in the intake housing 30 to mount the components securely in proper alignment. The bearing support 102 for the impeller shaft 40 is located coaxially within the stator hub 104 by a concentric support arm 108 having an open front 110 to receive the bearing support sleeve 102.

The stator hub 104 is preferably hollow to a certain extent. A stator end cap 112 is pressed into the front opening in the stator hub 104. The stator hub 104 preferably has an outer surface 116 that converges as the surface 116 extends rearward. The stator end cap 112 includes a small circumferential outer surface 118 that spans between diverging outer surface 82 of the impeller hub 78 and the converging outer surface 116 of the stator hub 104 to form a streamlined torpedo around which water flows through the pump 26. The stator end cap 112 supports oil seals 113 which seal around the bearing support portion 96 of the impeller shaft 40, and seal the interior of the stator hub 104. It is desirable to provide lubrication such as grease within the volume contained in the stator hub 104 in the stator end cap 112.

Displacement of the impeller shaft 40 transverse to the rotational axis of the impeller shaft 40 is minimized by the impeller mounting system. Referring in particular to FIG. 2, the forwardmost portion of the impeller shaft 40 is rigidly mounted within the ball bearing assembly 44 in the intake housing 30 while the aft portion of the impeller shaft 40 is rigidly secured for rotation in the bearing support sleeve 102. The location of the bearing support sleeve 102 is rigidly fixed with respect to the intake housing 30 because the bearing support sleeve 102 is located in the stator hub 104 and the stator 52 as well as the wear ring 50 are rigidly mounted to the intake housing 30.

Figure 4:
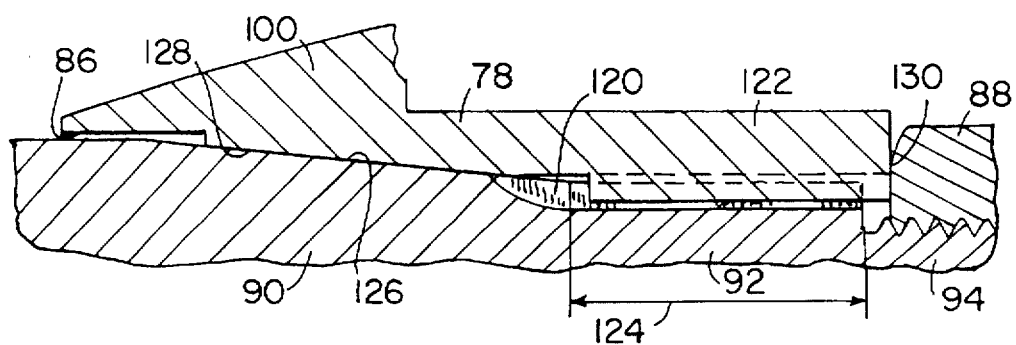
FIG. 4 is a detailed view of an interface between an impeller hub and an impeller shaft in accordance with the invention.
Figure 5:
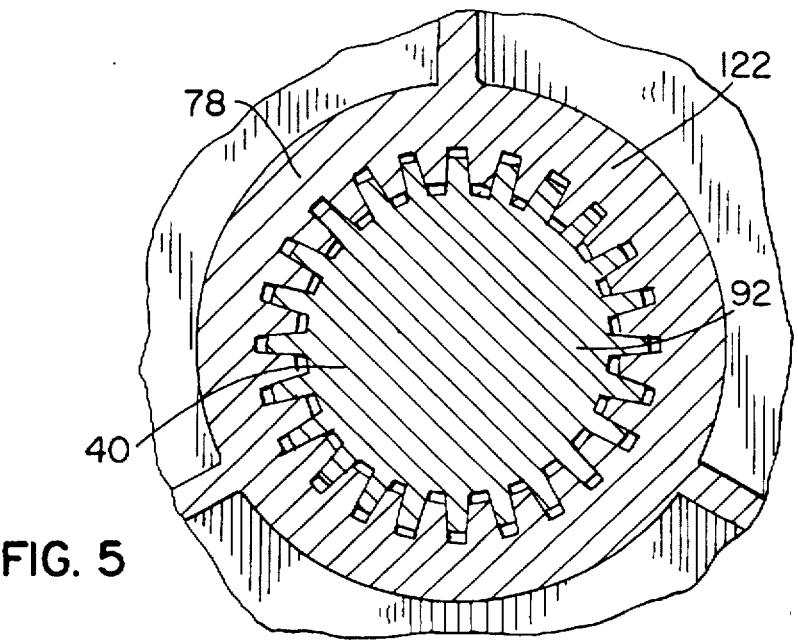
FIG. 5 is a sectional view taken along lines 5—5 in FIG. 3.

Referring again to FIGS. 3–6, the splined portion 92 of the impeller shaft 40 extends rearward of the tapered portion 90 of the impeller shaft 40 to the threaded portion 94 of the impeller shaft 40. The forwardmost portion of the splines 92 extend slightly into the tapered portion 90 of the shaft. See reference numeral 120 in FIGS. 4 and 6. The splined portion 92 on the impeller shaft 40 loosely engages a splined section 122 in the coaxial opening 86 in the impeller hub 38. The splined section 122 in the coaxial opening 86 in the impeller hub 78 preferably has a constant diameter corresponding to the constant diameter portion of the splined portion of the impeller shaft 40. The constant diameter of the splined section 122 of the coaxial opening through the impeller hub 78 is less than the smallest diameter of the tapered seat 100 of the coaxial opening through the impeller hub 78. The length of the splined section 122 through the impeller hub 78 is selected so that the jam nut 88 can be properly tightened on the threaded portion 94 of the impeller shaft 40. In other words, the distance 124 between the threaded portion 94 of the impeller shaft and the smallest diameter of the tapered portion 90 of the impeller shaft should be sufficiently small compared to the length of the splined section 122 in the impeller hub 78 so that the impeller shaft friction surface 126 along the tapered portion 90 of the impeller shaft 40 presses tightly against the impeller hub friction surface 128 along the tapered section 100 for the impeller hub 78 when the jam nut 88 is tightened against an aft end 130 of the coaxial opening 86 through the impeller hub 78. It is the purpose of the invention to rely on static friction forces between friction surface 126 on the tapered portion 90 of the impeller shaft and friction surface 128 on the tapered seat 100 in the impeller hub 78 to prevent the impeller hub 78 from slipping with respect to the impeller shaft 40 under normal operating conditions. On the other hand, the purpose of the splines 92 and 122 is to prevent excessive slipping in case jam nut 88 becomes loose or in case slipping occurs for some other reason. Since the splines 92 and 102 are not designed to carry the load of the jet pump 26, it is not critical that the splines 92 and 102 interconnect tightly or even snugly. It is preferred that the splines 92 and 122 engage loosely to facilitate easier assembly and disassembly of the hub 38 onto the impeller shaft 40. Even though the splines 92 and 102 are loosely engaged with one another, the splines 92 and 122 do not create chatter noise or wear under normal operation because the friction surfaces 126 and 128 bear the entire load.

Referring in particular to FIG. 6, the impeller 38 can be removed from the impeller shaft 40 quickly and easily by removing the nozzle 56 and stator 52, loosening jam nut 88, and pulling impeller 38 rearwardly off of the impeller shaft 40. Since the tapered portion 90 on the impeller shaft 40 is pressed into the tapered seat 100 of the coaxial opening 86 on the impeller hub 78, it will normally be necessary to use a mechanical or powered impeller removal device to remove the impeller 38 from the shaft 40. Flanges 136 facilitate removal of the impeller 38 from the impeller shaft extend radially inward from the impeller hub 78 into the interior volume 134. Thus, a removal device can be inserted into the interior volume 134 of the impeller hub 78 in front of flanges 136 through spaces between the flanges 136 and can be twisted to engage the flanges 136. The impeller removal device should provide means for pushing against the rearward end surface 132 of the impeller shaft 40 in the forward direction, and pushing flanges 136 in the rearward direction. The impeller 38 hub includes an interior volume 134. Note that the diameter of the aft portion of impeller shaft 40 never increases as the shaft 40 extends rearward.

Figure 7:
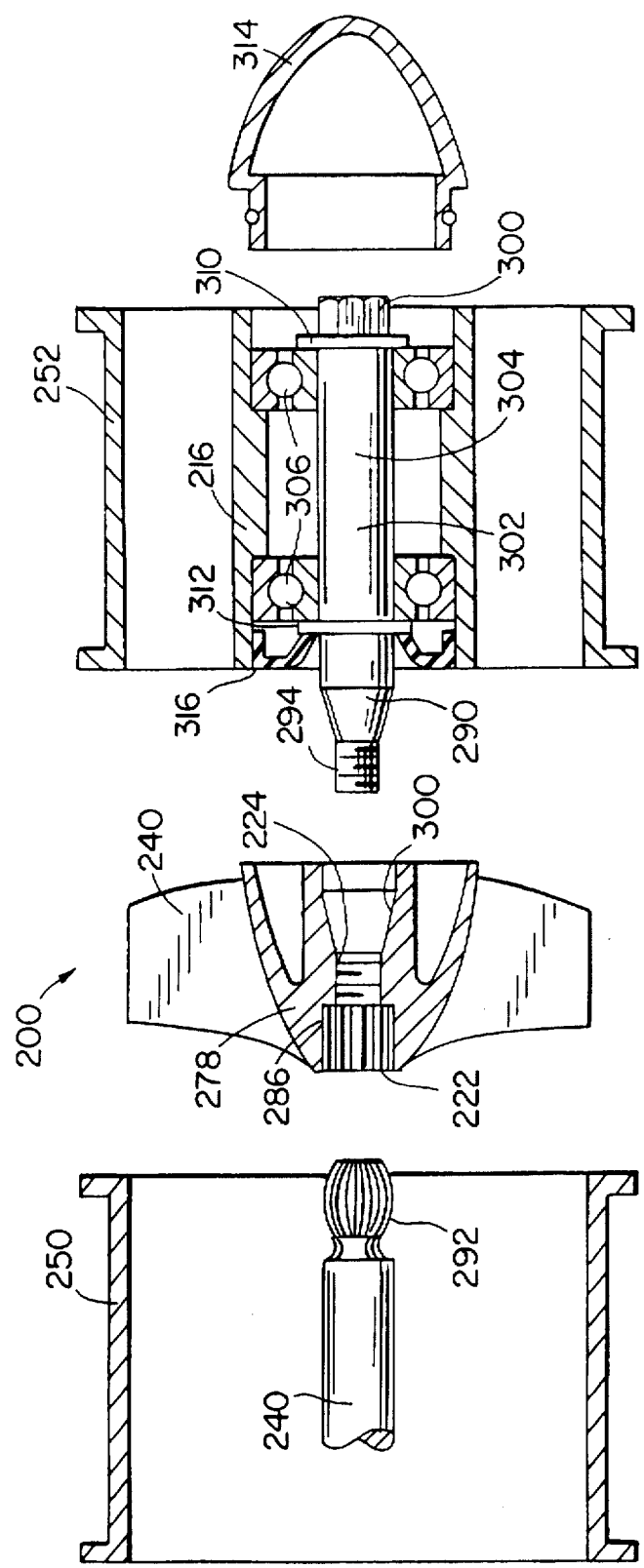
FIG. 7 is an assembly view of another impeller mounting system in accordance with the invention.

FIG. 7 shows another impeller mounting system 200 in accordance with the invention. In the system 200 shown in FIG. 7, the impeller 240 includes a coaxial opening 286 having a splined section 222, a threaded section 224, and a tapered seat 300. The tapered seat 300 is located rearward of the splined section 222 and rearward of the threaded section 224. The tapered seat 300 is also oriented to open rearward, which is in contrast to the system shown in FIGS. 2–6. In FIG. 7, the impeller shaft 240 includes a splined portion 292 at the aft end of the impeller shaft 240. The splined portion 292 of the impeller shaft 240 is received in the splined section 222 in the coaxial opening 286 of the impeller hub 278. In the system 200, the splines 292 on the impeller shaft 240 engage the splines 222 in the impeller hub 278 to drive the impeller 240 within the wear ring 250.

The system 200 shown in FIG. 7 includes a stator shaft 302 rotatably supported within the hub 216 of a stator 252. Ball bearings 306 support the stator shaft 302 for rotation within the stator hub 216. The stator shaft 302 includes a main portion 304 having a constant diameter, a tapered portion 290 located forward of the main portion 304, and a threaded portion 294 located forward of the tapered portion 290. The stator shaft 302 is received in the coaxial opening 286 of the impeller hub 278 and is tightened into place by turning a wrench fitting 308 on the stator shaft 302. Threads 294 on the stator shaft 302 screw into the threads 224 in the impeller hub 278 to force the tapered portion 290 of the stator shaft 302 against the tapered seat 300 in the impeller hub 278. Snap rings 310 and 312 maintain the stator shaft 302 in the proper axial position. Stator end cap 314 and lip seal 316 seal the stator hub 216 so that lubricant within the hub 216 does not escape.

Although the impeller mounting system 200 shown in FIG. 7 does not necessarily reduce impeller drive chatter noise associated with splines 292 and 222, the system 200 facilitates proper concentric alignment of the impeller 240 within the wear ring 250 because the stator shaft 302 is easy to locate properly in the stator hub 216 and the tapered portion 290 of the stator shaft 302 is forced against the tapered seat 300 of the coaxial opening 286 in the impeller hub 278.

It is recognized that various alternatives, modifications and equivalents of the invention are possible in accordance with the true spirit of the invention. Such modifications, alternatives and equivalents should be considered to be within the scope of the following claims.

I claim:

1. A jet propelled watercraft comprising:

an impeller that rotates within a wear ring, the impeller having an impeller hub and one or more impeller blades extending outward from the hub, the impeller hub having a coaxial opening that includes a tapered seat in which the diameter of the opening lessens as the opening extends rearward through the impeller hub and a splined section rearward of the tapered seat the diameter of the splined section of the coaxial opening through the impeller hub being constant and less than the smallest diameter of the tapered seat of the coaxial opening through the impeller hub;

an impeller shaft that is mounted through the impeller by locating the impeller shaft through the coaxial opening in the impeller hub, the impeller shaft including:
a main portion,
a tapered portion rearward of the main portion in which the diameter of the impeller shaft lessens as the impeller shaft extends rearward,
a threaded portion rearward of the tapered portion and having a diameter smaller than the smallest diameter of the tapered portion;
a splined portion between the tapered portion of the impeller shaft and the threaded portion of the impeller shaft that engages the splined section of the coaxial opening through the impeller hub, the outer diameter of the threaded portion of the impeller shaft being less than the smallest diameter of the splined portion of the impeller shaft, and a jam nut that engages the threaded portion of the impeller shaft to tighten the impeller shaft within the coaxial opening through the impeller hub so that the tapered portion of the impeller shaft presses against the tapered seat of the coaxial opening in the impeller hub with sufficient force to prevent the impeller hub from slipping with respect to the impeller shaft when the impeller shaft rotates to drive the impeller hub;

wherein the splined portion of the impeller shaft loosely engages the splined section of the coaxial opening through the impeller hub when the impeller shaft is mounted through the impeller hub and the jam nut is tightened to tighten the impeller hub on the impeller shaft.

2. The invention as recited in claim 1 wherein the distance between the threaded portion of the impeller shaft and the smallest diameter of the tapered portion of the impeller shaft is no greater than the distance between a location in the tapered seat of the coaxial opening of the impeller hub having the same diameter as the smallest diameter of the tapered portion of the impeller shaft and an aft end of the coaxial opening through the impeller hub.

3. The invention as recited in claim 1 wherein:

the watercraft further includes a bearing support rearward of the coaxial opening through the hub; and the impeller shaft further includes a non-threaded bearing support portion rearward of the threaded portion, the non-threaded bearing support portion of the impeller shaft being rotatably supported by the bearing support located rearward of the coaxial opening through the hub, the diameter of the non-threaded bearing support portion of the impeller shaft being less than the diameter of the threaded portion of the impeller shaft.

4. The invention as recited in claim 3 wherein the watercraft further comprises a stator mounted to the watercraft rearward of the wear ring and the impeller, and the stator includes a stator housing, a coaxial stator hub, a plurality of stator vanes attaching the coaxial stator hub to the stator housing, and the bearing support that receives the non-threaded bearing support portion of the impeller shaft, the bearing support portion being located within the coaxial stator hub.

5. The invention as recited in claim 4 further comprising a stator end cap having a sealed opening through which the impeller shaft passes between the impeller hub and the bearing support in the stator hub.

6. The invention as recited in claim 5 wherein the interior of the stator hub contains lubrication and the stator end cap seals the interior of the stator hub around the non-threaded bearing support portion of the impeller shaft.

7. The invention as recited in claim 4 wherein the wear ring and the stator housing have exterior flanges, and mounting bolts pass through the flanges on the stator housing and the flanges on the wear ring to secure the wear ring and the stator housing to an intake housing for the jet pump.

8. The invention as recited in claim 1 wherein the tapered portion of the impeller shaft is frustoconical and the diameter of the tapered portion of the impeller shaft reduces linearly as the shaft extends rearward.

9. The invention as recited in claim 8 wherein the frustoconical shape of the tapered portion of the impeller shaft has a cone angle of less than 30° included.

10. The invention as recited in claim 9 wherein the frustoconical shape of the tapered portion of the impeller shaft has a cone angle of about 10° included.

11. The invention as recited in claim 1 wherein the impeller hub includes:

an interior volume rearward of the coaxial opening; and at least one flange extending inward from the impeller hub into the internal volume rearward of the coaxial opening through the impeller hub.

12. A jet propelled watercraft comprising:

an impeller that rotates within a wear ring, the impeller having an impeller hub and one or more impeller blades extending outward from the hub, the impeller hub having a coaxial opening that includes a tapered seat in which the diameter of the opening lessens as the opening extends forward through the impeller hub and a splined section located forward of the tapered seat;

a stator shaft rotatably mounted rearward of the impeller and including a tapered portion that engages the tapered seat in the coaxial opening in the impeller hub when the impeller hub is tightened to the stator shaft; and an impeller shaft that includes a splined portion that engages the splined section in the coaxial opening in the impeller hub to drive the impeller within the wear ring.

\* \* \* \* \*